Dec. 30, 1952     E. SCHUTZ     2,623,554
CUTTER GUARD FOR WOODWORKING MACHINES
Filed May 14, 1948     2 SHEETS—SHEET 1

INVENTOR
Ewald Schutz
BY
Ramsey, Chisholm + Hilder
ATTORNEYS

Dec. 30, 1952  E. SCHUTZ  2,623,554
CUTTER GUARD FOR WOODWORKING MACHINES
Filed May 14, 1948  2 SHEETS—SHEET 2
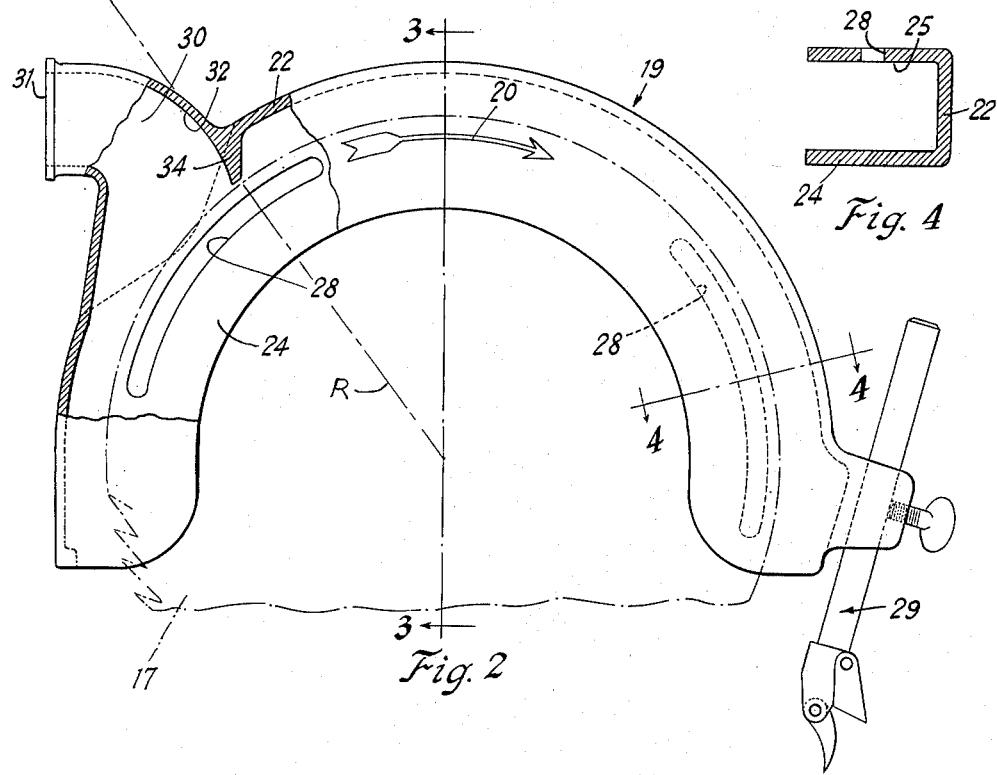
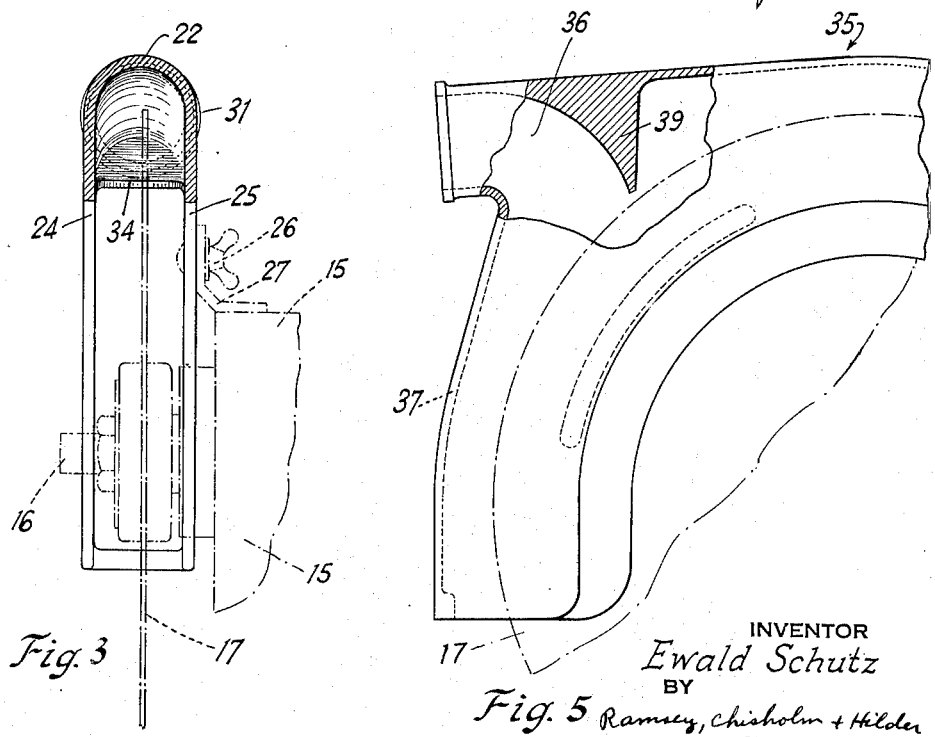
INVENTOR
Ewald Schutz
BY
Ramsey, Chisholm + Hilder
ATTORNEYS Patented Dec. 30, 1952

2,623,554

UNITED STATES PATENT OFFICE 2,623,554

CUTTER GUARD FOR WOODWORKING MACHINES

Ewald Schutz, Lancaster, Pa., assignor, by mesne assignments, to De Walt Inc., Lancaster, Pa., a corporation of Pennsylvania Application May 14, 1948, Serial No. 26,967

2 Claims. (Cl. 143—157)

This invention relates to woodworking machines having power-driven rotary saws or other cutters, and the invention is directed to the improvement of the protective guard usually associated with the cutter of such a machine.

In one conventional form of woodworking machine there is a table for supporting the work, and a motor-driven cutter is so mounted above the table that it may be drawn across the work to effect a cutting operation. Since the most extensively used cutter is a circular or disc saw, these machines are often referred to as "sawing machines," "power saws," or even "saws." However, the saw disc of such machines may usually be replaced by other forms of rotary cutters for special operations, such as mitering, dadoing, rabbeting, etc.

Such machines are usually provided with an arcuate guard which encloses at least the upper and mid portion of the periphery of the cutter, this guard serving to prevent the saw operator and material being handled from coming into accidental contact with the cutter. During the cutting operation, the cutter projects a stream of sawdust and/or chips into the enclosing guard. This material progresses circumferentially within the guard in the direction of rotation of the cutter. The dust and chips have heretofore been led from the guard through a duct communicating with the interior thereof and leading tangentially in the direction of rotation of the cutter.

During crosscutting operations (cutting across the grain of wood) with this type of saw, the portion of the saw disc within the guard is rotating forwardly towards the operator. Accordingly, a tangentially-extending dust duct must lead more or less forwardly, i. e. toward the front of the machine where the operator stands. In the absence of a suction dust collection and removal system, which systems are not ordinarily used in small shops or with portable machines, the sawdust flies toward the operator during crosscutting operations and accumulates on the floor in front of the machine. This creates certain hazards for the operator, including the danger of dust getting in his eyes and the danger of his slipping on the accumulated sawdust.

To mitigate the foregoing difficulties, a 90° elbow has been placed on the discharge end of the tangentially-extending dust duct, the elbow being shiftable about the axis of the dust duct to discharge the dust in any desired direction in a vertical plane. However, the dust is still discharged in the vicinity of the operator and tends to accumulate on the worktable and in front of the machine.

In the form shown of the present invention, the saw guard is formed of a unitary casting embracing the upper and mid portions of the periphery of the saw disc. A dust discharge duct opens from the peripheral surface of the rear portion of the guard and extends in a sweeping curve to a rearwardly-facing discharge opening. A baffle projects within the guard just beyond the duct opening, preferably as an extension of the curve of the adjacent portion of the wall of the duct, to a position adjacent to the saw disc. This baffle intercepts the sawdust and air travelling peripherally within the guard, and directs the same into the discharge duct.

An object of the present invention is to provide in a sawing machine, a saw guard having means to discharge the sawdust toward the rear of the machine without the use of a suction dust removal system or the like.

Another object of the invention is to provide a saw guard having means to direct sawdust from the guard in a direction contrarywise to the direction of rotation of the saw disc.

Additional objects of the invention are to achieve the foregoing results in a simple, inexpensive, and practical manner, and to generally improve saw guards for sawing machines.

Further objects and objects relating to details and economies of manufacture and use will more definitely appear from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification, in which:

Fig. 2 is a side elevation of the saw guard of the machine shown in Fig. 1, a portion of the guard being shown in section and the saw disc being indicated in dot-dash lines.

Fig. 3 is a vertical section of the saw guard taken on the line 3—3 of Fig. 2, adjacent parts of the machine being indicated in dot-dash lines.

Fig. 4 is a detail section of the saw guard, showing only the cross-sectional shape of the guard at line 4—4 of Fig. 2.

Fig. 5 is a fragmentary elevation of a modified form of saw guard, a portion of the guard being shown in section and a portion of the saw disc being indicated in dot-dash lines.

Figure 1:
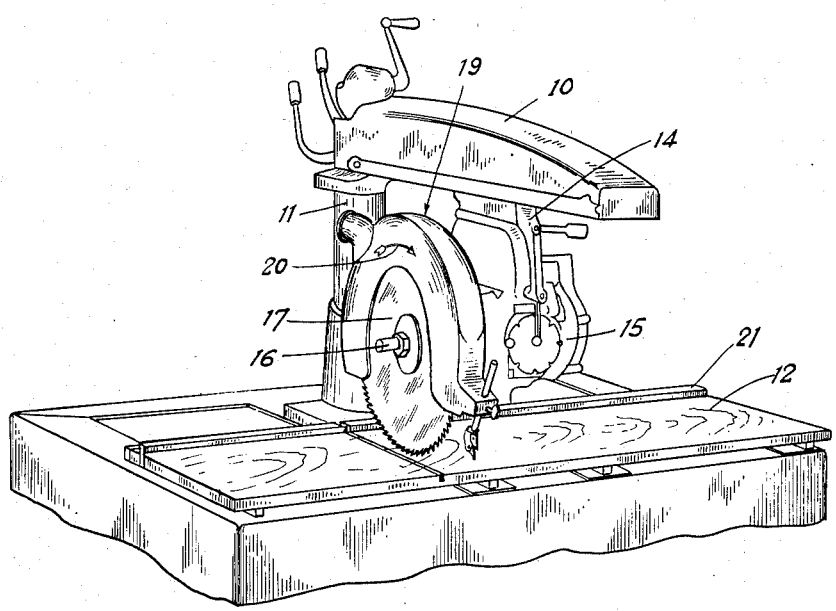
Fig. 1 is a somewhat diagrammatic perspective view of the upper portion of a sawing machine, embodying the present invention.

Referring now to the drawings, Fig. 1 shows one type of sawing machine to which the present invention is applicable. In this machine, a horizontal arm 10 is supported by a column 11 and projects over a horizontal saw table 12. The arm 10 is pivotally mounted on the column 11 for oscillation in a horizontal plane above the saw table 12 and may be locked in any desired angular position.

A saw carriage 14 is mounted for reciprocation along the arm 10 and carries an electric motor 15. A motor shaft extension or arbor 16 is directly driven by the motor 15 and has a circular saw disc 17 mounted thereon. The unit which includes the motor 15, arbor 16, and saw disc 17 is angularly adjustable as a whole about horizontal and vertical axes relative to the arm 10. The arm 10 is vertically adjustable by the column 11 to bodily raise or lower the saw disc 17 relative to the saw table 12, which table is stationary. Special circular cutters may be substituted on the arbor 16 for the saw disc 17, for dadoing, rabbeting and other special woodworking operations. A housing or saw guard 19 is supported from the housing of the motor 15 and concentrically surrounds at least the upper and middle portions of the periphery of saw disc 17. This guard is shown in more detail in Figs. 2, 3 and 4.

For crosscutting, the saw carriage is positioned as indicated in Fig. 1, the saw disc 17 rotating in the direction indicated by the arrow 20 on the saw guard 19, which direction is clockwise as viewed from the left of the machine. Work to be sawed is placed on the surface of the saw table 12 and held against a raised stop or guide 21 which extends along the rear of the table. The saw carriage 14, which is provided with a suitable handle to be grasped by the operator, is then drawn forwardly along the arm 10 so as to engage the rotating saw disc 17 with the work. During the cutting operation the reaction between the saw and the workpiece is in such direction as to tend to force the work downwardly against the saw table 12 and rearwardly against the guide 21. If the saw disc 17 were rotated in the opposite direction, it would tend to displace the work forwardly and there would be considerable difficulty in holding the work in position.

Referring now to Figs. 2 and 3, the saw guard 19 is preferably formed as a unitary cast housing of light metal, such as an alloy of aluminum or magnesium. The guard has a generally arcuate peripheral wall 22 of somewhat greater radius than that of the saw disc 17. This peripheral wall may extend for somewhat more than 180°, as shown in Fig. 2, so that the guard will encompass not only the top half of the saw disc but also front and rear zones of the cutting edge of the saw disc which lie below the horizontal center line of the disc as viewed in Fig. 2. The peripheral wall 22 of the guard merges with parallel side walls 24 and 25 which extend radially inwardly in spaced parallel planes so as to cover a circumferentially-extending zone of the saw disc positioned inwardly of the cutting edge.

Throughout the major portion of its length the wall 22 has the arcuate cross section shown in Fig. 3. However, as the position of section line 4—4 in Fig. 2 is approached, progressing in the direction of arrow 20, the cross-sectional shape of wall 22 changes to the flat form shown in Fig. 4.

Attached to the housing of the motor 15 in circumferentially-spaced relation are two duplicate brackets, one of which is indicated at 27 in Fig. 3. These brackets are provided with bolts and winged nuts as indicated at 26, the bolts passing through the slots 28, 28 in the guard and serving to secure the guard in operating position. By loosening the winged nuts the guard may be circumferentially shifted or rocked, either forward or backward, after which the winged nuts may be tightened to hold the guard in the position to which it has been shifted.

An anti-kickback device 29 may be adjustably mounted on the forward end of the saw guard 19, this device being adjusted to engage the work when ripping is to be done and being moved upwardly out of work-engaging position when crosscutting is to be done. Such an anti-kickback device is described in detail in my copending application Serial No. 734,944, issued July 31, 1951, as Patent No. 2,562,396.

As best seen in Fig. 2, a sawdust conducting duct 30 leads from an opening in the peripheral wall 22 of the guard. This duct leaves the interior of the guard in an upward direction and then makes a sweeping right-angle turn to the rear, so that the duct discharges rearwardly. The duct 30 is preferably circular in cross section adjacent to its mouth 31, the balance of the duct being of transition section merging smoothly with the peripheral wall 22 and side walls 24 and 25 of the guard. The central plane of the duct, viewed as in Fig. 3, lies approximately in the plane of the saw disc 17.

The outside curve 32 of the duct 30 extends smoothly from the interior of the guard to the discharge end 31 of the duct. A baffle 34, which preferably merges with wall portion 32 of the duct, extends inwardly to a point closely adjacent to the cutting edge of the saw disc 17. Progressing around the guard in the direction of saw rotation, this baffle is located just beyond the mouth of the duct 30.

During operation of the machine, the saw disc 17 rotates at a high rate of speed. Sawdust and chips of wood resulting from the cutting operation are swept upwardly from the work by the teeth of the saw disc 17 and move within the guard 19, being carried along by momentum as well as by a current of air dragged along within the saw guard by the rapidly revolving saw disc. The sawdust tends to move tangentially and therefore it tends to hug the guard wall 22 as it proceeds circumferentially within the guard. However, the sawdust is relatively light and its volume is such that there is a circumferentially travelling layer of sawdust between the guard wall 22 and the cutting edge of the saw. Some of the sawdust of this layer enters directly into the mouth of duct 30, proceeding tangentially from its arc of travel within the guard. The remainder of the sawdust strikes baffle 34 and is deflected into the duct 30. Curved wall 32 of the duct directs all of the sawdust to the rear for discharge at 31.

It will be noted that the surface of baffle 34 is offset in a counterclockwise direction, as viewed in Fig. 2, from the saw radius R which is tangent to duct curve 32. This insures the sawdust being directed into the duct 30 rather than back toward the cutting edge of the saw. The sawdust discharged rearwardly from the duct 30 may be permitted to accumulate at the rear of the machine where it will be of no great hindrance or hazard.

Figure 6:
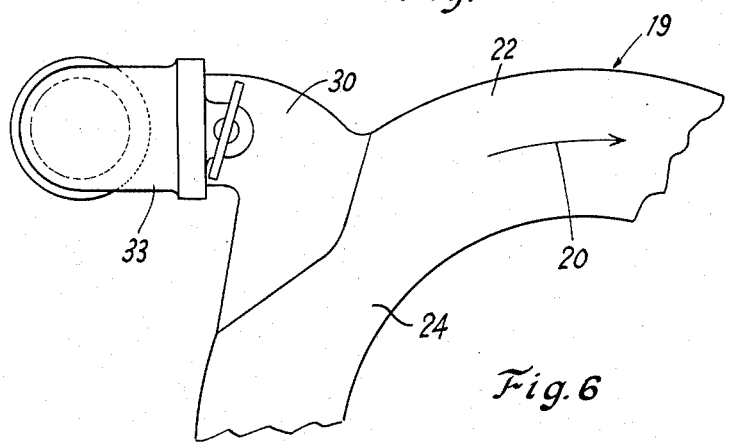
Fig. 6 (Sheet 1) is a fragmentary side elevation of the saw guard shown in Figs. 1, 2 and 3 with an adjustable discharge spout attached thereto.

The saw guard as it is shown in Figs. 1 and 2 is well adapted for crosscutting operations. When ripping, the saw disc 17, together with the saw motor 15, is rotated 90° about a vertical axis from the position shown in Fig. 1, thus placing the plane of the saw disc parallel with the guide 21. To direct the sawdust to the rear of the machine, the flanged mouth 31 of the duct 30 is fitted with a 90° elbow 33 as shown in Fig. 6. This elbow is similar to that disclosed in my above-referred to application Serial No. 734,944. The elbow, which is preferably removed during crosscutting operations, is adjustable about a horizontal axis to any desired position.

An alternative form of saw guard is shown in Fig. 5. The guard 35 there shown has a duct 36 positioned higher in the peripheral wall portion 37 of the guard and the baffle 39 extends downwardly farther, to a position adjacent to the cutting edge of the saw disc 17 in order to intercept the sawdust moving along the peripheral wall of the guard. This form of guard operates the same as the guard 19 and this form of the casting is preferable for certain sizes of guards.

Either form of guard may be provided with tapped holes (not shown) in wall 24 for attachment to the guard of a suitable cover plate to cover the projecting end of the arbor 16 (Fig. 1) and the lateral opening in the guard through which the arbor projects. One form of cover plate for this purpose is shown in U. S. patent to Knapp 1,888,679 issued November 22, 1932.

I claim:

1. In a sawing machine having a saw table and a power-driven saw disc mounted above the table for movement thereacross: a guard for said saw, said guard having a generally concentric arcuate peripheral wall extending about the upper portion of the saw disc, a dust duct leading from the interior of the guard through the peripheral wall in the general direction of rotation of the saw disc, said duct being curved to discharge dust in a direction generally opposite to said direction of rotation, and a baffle within the guard rotationally just beyond the duct projecting inwardly in a curve tangential to a radius of the saw disc to direct sawdust moving circumferentially of the saw disc into the duct.

2. In a sawing machine having a saw table and a power-driven saw disc mounted above the table for movement thereacross: a guard for said saw disc, said guard comprising a metal housing having a generally concentric arcuate peripheral wall and radially inwardly-projecting side walls, the guard extending about the upper and mid portions of the saw disc, and a dust duct leading from the interior of the guard through the peripheral wall in the general direction of rotation of the saw disc, said duct having a wall curved to discharge dust in a direction generally opposite to said direction of rotation and said wall of the duct constituting the outside curve thereof tangential to a radius of said saw disc and terminating within the saw guard immediately adjacent to the cutting edge of the saw disc and at a point rotationally in advance of any point on the radius tangential thereto.

EWALD SCHUTZ.

REFERENCES CITED

The following references are of record in the file of this patent:

UNITED STATES PATENTS

| Number | Name | Date |
| --- | --- | --- |
| 396,934 | Hutchinson | Jan. 29, 1889 |
| 790,943 | Weber | May 30, 1905 |
| 922,840 | Bemiller | May 25, 1909 |
| 1,830,151 | Wilderson | Nov. 3, 1931 |
| 1,888,679 | Knapp | Nov. 22, 1932 |
| 2,257,459 | Gardner | Sept. 30, 1941 |